US007234378B2

(12) United States Patent
Reynertson, Jr.

(10) Patent No.: US 7,234,378 B2
(45) **Date of Patent: *Jun. 26, 2007**

(54) DIGITAL TORQUE WRENCH

(75) Inventor: John L. Reynertson, Jr., Geneva, IL (US)

(73) Assignee: Ryeson Corporation, Franklin Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/403,800

(22) Filed: Apr. 13, 2006

(65) Prior Publication Data

US 2006/0248992 A1 Nov. 9, 2006

Related U.S. Application Data

(63) Continuation of application No. 10/427,821, filed on May 1, 2003, now Pat. No. 7,082,865.

(51) Int. Cl.

| | |
|---|---|
| ***B25B 23/159*** | (2006.01) |
| ***B25B 23/14*** | (2006.01) |
| *G01L 5/24* | (2006.01) |

(52) U.S. Cl. ........................ 81/479; 81/483; 73/862.23

(58) Field of Classification Search .................. 81/479, 81/483; 73/862.23

See application file for complete search history.

(56) References Cited

U.S. PATENT DOCUMENTS

| | | | | |
|---|---|---|---|---|
| 4,643,030 | A * | 2/1987 | Becker et al. | 73/862.23 |
| 4,982,612 | A * | 1/1991 | Rittmann | 73/862.23 |
| 5,503,028 | A * | 4/1996 | Brihier | 73/862.21 |
| 6,070,506 | A * | 6/2000 | Becker | 81/479 |
| 6,119,562 | A * | 9/2000 | Jenkins | 81/479 |
| 6,253,626 | B1 * | 7/2001 | Shoberg et al. | 73/862.044 |
| 6,276,243 | B1 * | 8/2001 | Jenkins | 81/479 |
| 6,526,853 | B2 * | 3/2003 | Jenkins | 81/479 |
| 7,082,865 | B2 * | 8/2006 | Reynertson, Jr. | 81/479 |
| 7,089,834 | B2 * | 8/2006 | Reynertson et al. | 81/479 |
| 2003/0094081 | A1 * | 5/2003 | Becker et al. | 81/479 |
| 2005/0126351 | A1 * | 6/2005 | Becker et al. | 81/479 |

* cited by examiner

*Primary Examiner*—David B. Thomas
(74) *Attorney, Agent, or Firm*—Marshall, Gerstein & Borun LLP

(57) ABSTRACT

A digital torque wrench is disclosed having a transducer beam with a reduced thickness web therein. At least one strain gauge sensor is mounted to the internal web to measure the shearing stress within the web as the wrench is rotated. By using such a reduced thickness web, mounting the sensors in opposed orientations, mounting the transducer beam to the torque wrench handle using first and second longitudinal flanking pins, and providing the transducer beam in a tapered shape, the resulting measurement of the torque wrench is very accurate. Moreover, a rotational interface module with digital display is provided to facilitate reading of the display by the user.

15 Claims, 5 Drawing Sheets

DIGITAL TORQUE WRENCH

CROSS REFERENCE TO RELATED APPLICATION

This application is a continuation application of U.S. patent application Ser. No. 10/427,821, filed May 1, 2003 now U.S. Pat. No. 7,082,865.

FIELD OF THE DISCLOSURE

The disclosure generally relates to hand tools and, more particularly, relates to torque wrenches.

BACKGROUND OF THE DISCLOSURE

In many industrial applications, the tightening of threaded fasteners to a specific degree or torque is of extreme importance. For example, in the assembly of automobiles or aircraft, it is imperative that nuts, bolts, screws, lugs, and the like, are tightened to a pre-specified torque to ensure the resulting assembly functions properly not only at initial use, but over the long term. Moreover, it is not sufficient that the device simply be tightened as far as possible as this may result in stripping of the threads or vibrational problems in the resulting assembly.

Accordingly, it has long been known to use torque wrenches for tightening such devices. Such wrenches are not only able to rotate and tighten the device, but also provide the user with some sort of indication as to exact torque being applied. Such devices can be as straight forward as a bendable beam type wrench having a straight strain gauge thereon, whereby the user is provided with an indication as to the torque being applied by observing the degree of deflection of the bendable beam relative to the strain gauge. The strain gauge is provided with numbered graduations to provide the user with an accurate measurement.

In still further devices, it is known to provide the torque wrench in a ratchet type of assembly wherein each rotation or click of the ratchet represents a discrete level of torque being applied. However, such a device is normally not sufficiently accurate for the specifications being set forth by the automotive and aircraft industries which commonly employ such devices. More specifically, as each click represents only a discrete number of foot pounds, any movement between clicks will result in additional torque being applied, but not measured.

In still further torque wrench designs, known as shearing stress designs, sensors are mounted to a transducer of the wrench. The sensors measure the shearing stress being applied to the transducer as the wrench is rotated. A processor is provided on the wrench to then calculate the resulting torque based on the shearing stress being measured. However, all currently known torque wrenches of such a design suffer from certain drawbacks resulting in less than optimally accurate measurements. For example, if the torque wrench is used such that force is imparted along a vector other than that causing rotation of the wrench, the transducer can tend to bend which results in shearing stress on the transducer not reflective of the torque being applied. Moreover, given the relatively uniform construction of such transducers, the shearing stress applied across the transducer is often not uniform and thus also results in inaccurate readings. Furthermore, the transducers are often mounted to a handle to which the processor is mounted using one or more pins or rivets mounted to the back of the transducer. Given such localization of the mounting structure, the transducer is subjected to bending forces making measurement of only the shearing stress resulting from the torque being applied difficult.

With the above-mentioned type of torque wrench, the transducer sensor is electrically coupled back to the processor provided on the handle. Accordingly, conductors are provided and are typically mounted on the outside surface of the transducer, thereby lending themselves to damage through normal usage. This can result in abrasion of the insulation provided about the conductor and ultimately the creation of an electrical short. This is especially true in that, although not recommended, such wrenches are often used as makeshift hammers or are otherwise mishandled. Moreover, with such torque wrenches the processor is typically provided with some sort of interface module providing the reader with a display of the torque being measured. However, given the angle at which the wrench is being used, the display is not always readily perceptible as it may be rotated or positioned at a position inconvenient for the user in taking such a measurement.

SUMMARY OF THE DISCLOSURE

In accordance with one aspect of the disclosure, a torque wrench is disclosed which may comprise a transducer beam, a sensor, a torquing tool, a handle, and an interface module. The transducer beam may further include a top side, a bottom side, first and second lateral sides, and first and second ends. The transducer beam may further include a web of reduced thickness extending across the beam between the first and second sides. The sensor may be mounted to the web, with the torquing tool being mounted to the first end of the lever. The lever second end may be mounted to the handle with the interface module being mounted to the handle as well. The interface module may include a processor electrically coupled to the sensor and a display adapted to receive a signal from the processor and display torque measurement.

In accordance with another aspect of the disclosure, a torque wrench is disclosed which may comprise a transducer beam, a sensor, and a processor. The transducer beam may include first and second sides, a top surface, and a bottom surface, with the first and second sides tapering the beam from a narrow handle end to a wide tool mounting end. The sensor may be mounted to the transducer and be adapted to generate a signal related to shearing stress applied to the transducer beam. The processor may be electrically coupled to the sensor and be adapted to generate a signal related to torque based on the shearing stress signal.

In accordance with yet another aspect of the disclosure, a torque wrench is disclosed which may comprise a transducer beam, a sensor, a handle, and an interface module. The transducer beam may include first and second ends with the sensor being mounted to the transducer beam. The transducer beam may be mounted to the handle using first and second pins flanking the sensor in line with a longitudinal axis of the transducer beam. The interface module may be mounted to the handle and include a processor and a display.

These and other aspects and features of the disclosure will become more readily apparent upon reading the following detailed description when taken in conjunction with the accompanying drawings.

Figure 1:
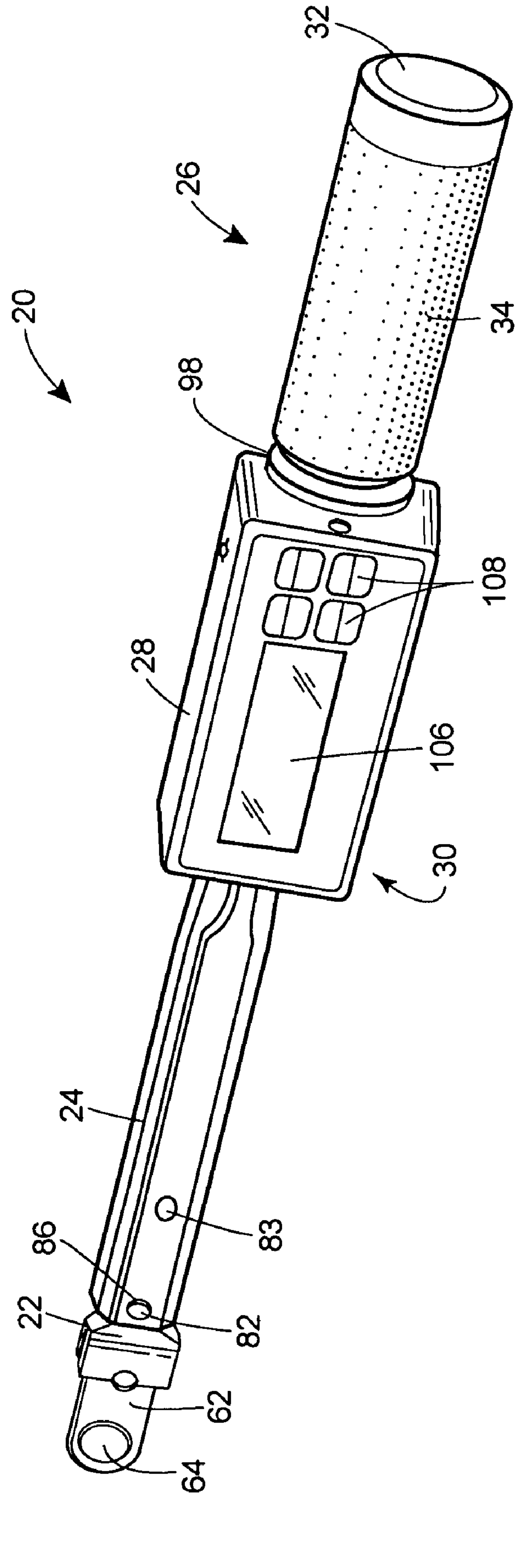
FIG. 1 is a perspective view of a digital torque wrench constructed in accordance with the teaching of the disclosure.

While the disclosure is susceptible to various modifications and alternative constructions, certain illustrative embodiments thereof have been shown in the drawings and will be described below in detail. It should be understood, however, that the is no intention to limit the disclosure to the specific forms disclosed, but on the contrary, the intention is to cover all modifications, alternative constructions, and equivalents falling within the spirit and scope of the invention as defined by the appended claims.

DETAILED DESCRIPTION OF THE DISCLOSURE

Turning now to the drawings, and with specific reference to FIG. 1, a torque wrench constructed in accordance with the teachings of the disclosure is generally referred to by reference numeral 20. As shown therein, the torque wrench 20 is of the type adapted to rotate threaded fasteners to a specified torque with a high degree of accuracy, e.g., within plus or minus one percent of the indicated torque. Such high quality, accurate wrenches are particularly applicable for use in tightly toleranced assembly processes including those of the automotive and aircraft industries. Moreover, while the torque wrench 20 is described and depicted as being a digital torque wrench, it is to be understood that its teaching could be employed for creating an analog output as well.

Referring now to FIGS. 1–4, the torque wrench 20 is shown to include a transducer beam 22 connected to a mounting bar 24, which in turn is connected to a handle 26. An interface module 28 is mounted to a first end 30 of the handle 26, with a second end 32 providing an area for grasping of the wrench 20 by the operator. To facilitate gripping the second end 32, it may be etched or provided with an elastomeric or other tactile covering 34.

Figure 7:
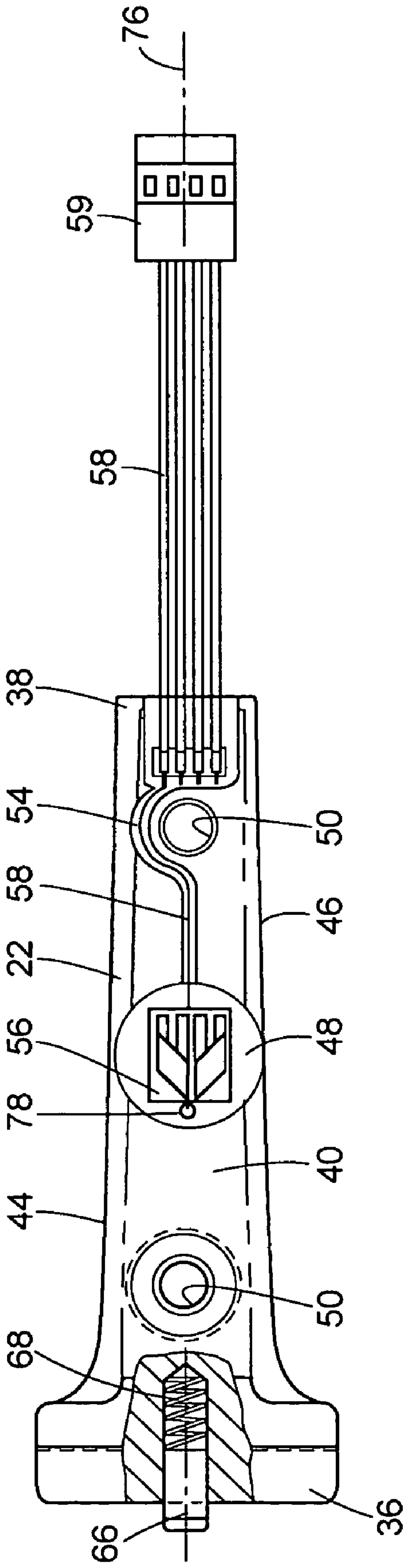
FIG. 7 is a top view of a transducer beam and sensor assembly constructed in accordance with the teachings of the disclosure.
Figure 8:
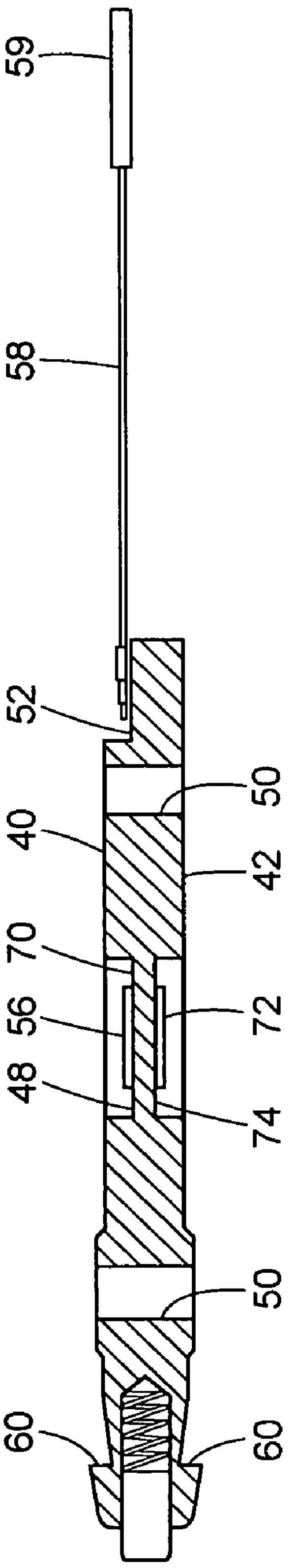
FIG. 8 is a sectional view of the transducer beam and sensor assembly of FIG. 7 taken along line 8—8 of FIG. 7.

Referring now to FIGS. 7 and 8, the transducer beam 22 is shown in more detail. As shown therein, the transducer beam 22 includes a first or tool mounting end 36, a second or handle mounting end 38, a top surface 40, a bottom surface 42, a first lateral side 44, and a second lateral side 46. In addition, the transducer beam 22 may include an internal web 48 of a thickness less than that of the remainder of the transducer beam 22 (as shown best in FIG. 8), as well as first and second mounting holes 50, the importance of which will be discussed in further detail herein. In so doing, the transducer beam 22 includes an "I" shaped cross-sectional configuration proximate the web 48. Moreover, as shown best in FIG. 7, the transducer beam 22 may include a wiring recess 52, as well as a wiring trench 54 to facilitate and protect the mounting of sensor 56 and associated wiring 58. The wiring 58 may terminate in a connector 59 for electrical coupling to a circuit board described later herein.

Figure 3:
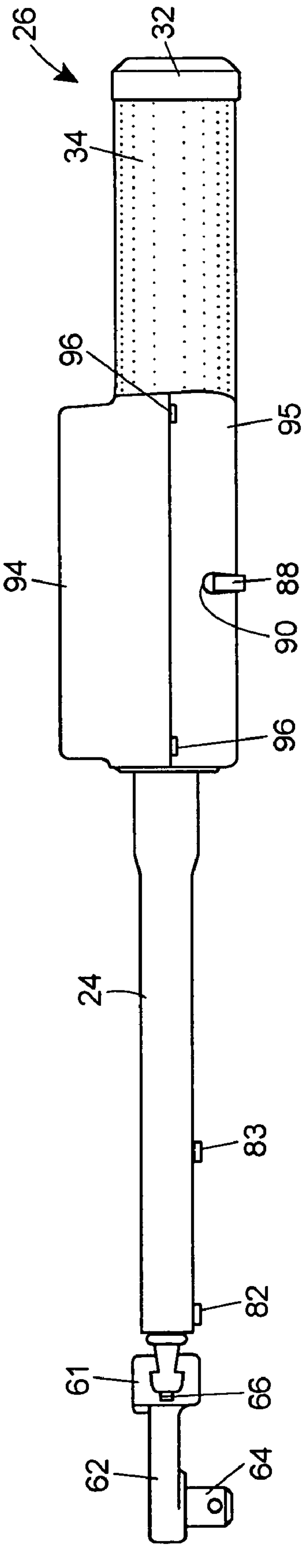
FIG. 3 is a side view of the torque wrench of FIG. 1.

With specific reference to the tool mounting end 36, it can be seen, particularly in reference to FIG. 8, to include a dove tail design having first and second rearward shoulders 60 adapted to interfit with, and grip to, a base 61 of a torquing tool 62 as shown in FIG. 3. The torquing tool 62 is depicted as that having a head 64 adapted to interfit with a conventional socket, but it is to be understood that the torquing tool 62 could be provided in a variety of other configurations including open-ended wrenches, box-head wrenches, flare nuts, tubing and other hand tool wrenching configurations. Moreover, it can be seen that the dovetailed tool mounting end 36 includes a retaining pin 66 biased outwardly, as by a spring 68, to facilitate gripping of the torquing tool 62 thereon.

Referring again to FIGS. 7 and 8, the transducer beam 22 is shown to further include the first sensor 56 on a top surface 70 of the web 48, with a second sensor 72 being mounted on a bottom surface 74 of a web 48. The sensors 56 and 72 may be so mounted by a suitable epoxy, adhesive or the like. Not only are the sensors 56 and 72 provided on the top and bottom surfaces 70 and 74, but each is preferably provided in a different orientation relative to a longitudinal axis 76 of the transducer beam 22. In so doing, the resulting measurement of the shearing stress across the web 48 is more accurate in that such orientation tends to cancel any stress resulting from anything other than the rotational movement of the wrench 20.

As far as the construction of sensors 56 and 72 is concerned, bonded foil strain gauges of the type adapted to measure shearing stress are preferable.

In order to electrically couple the sensors 56 and 72 to the interface module 28, the conductors 58 are provided. The conductors 58 are soldered to the wiring recess 52 and then strung through the wiring trench 54 for connection to the sensor 56. An aperture 78 is provided within the web 48 to allow the conductors 58 to connect to the sensor 72 provided on the bottom surface 74. In addition, a connector 80 is provided so as to enable connection of the conductors 58 to the interface module 28. By providing the recess 52 and the trench 54, it can be seen that the conductors 58 are substantially protected from any frictional or other potential source of damage through use of the wrench 20. Accordingly, the serviceable life of the wrench 20 is greatly improved.

Figure 2:
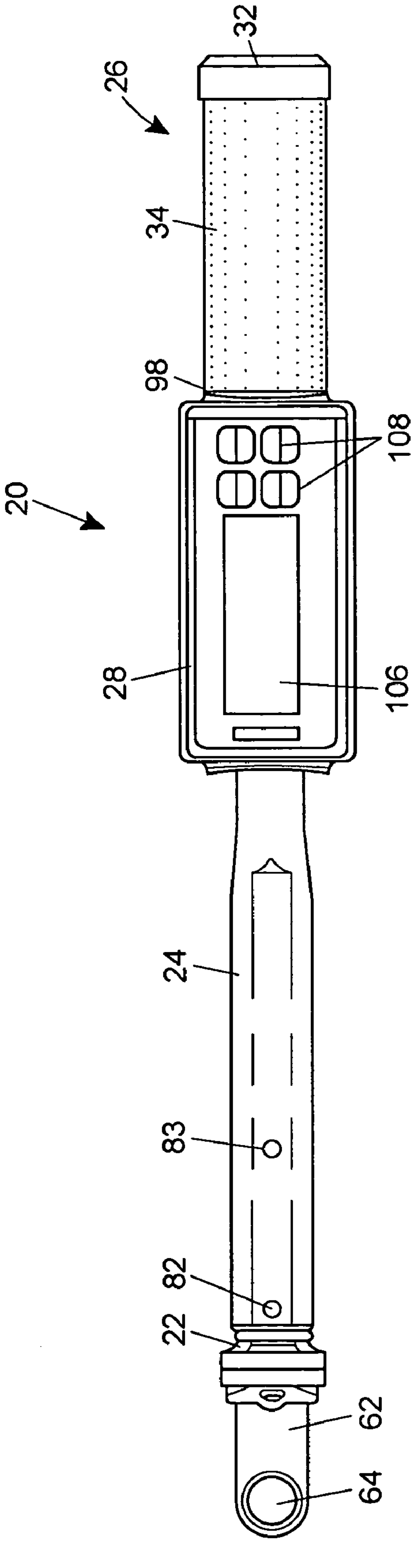
FIG. 2 is a top view of the torque wrench of FIG. 1.
Figure 4:
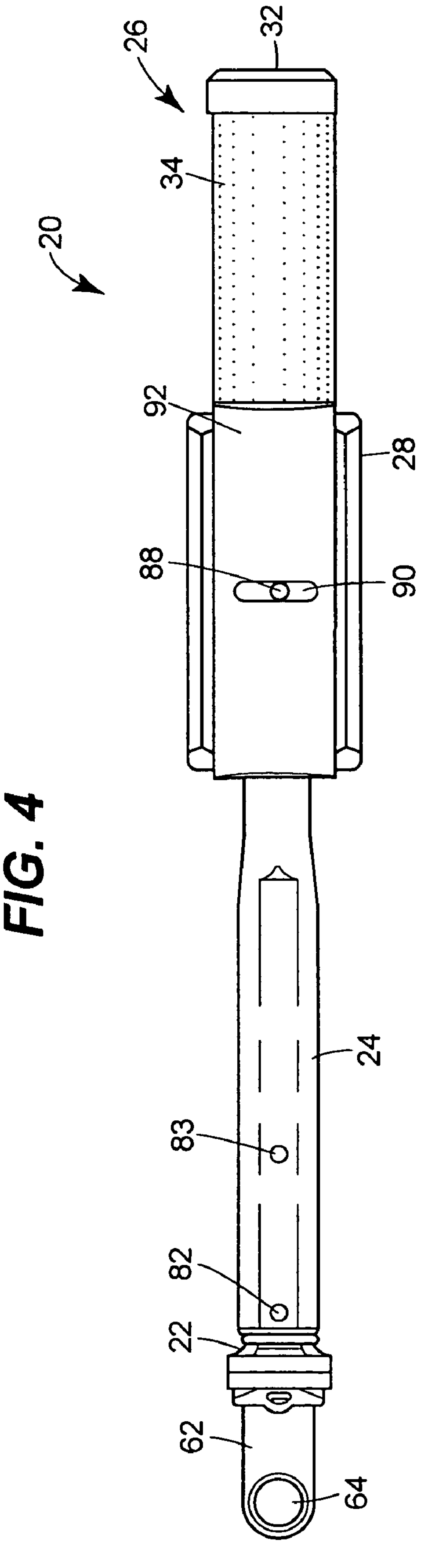
FIG. 4 is a bottom view of the torque wrench of FIG. 1.
Figure 6:
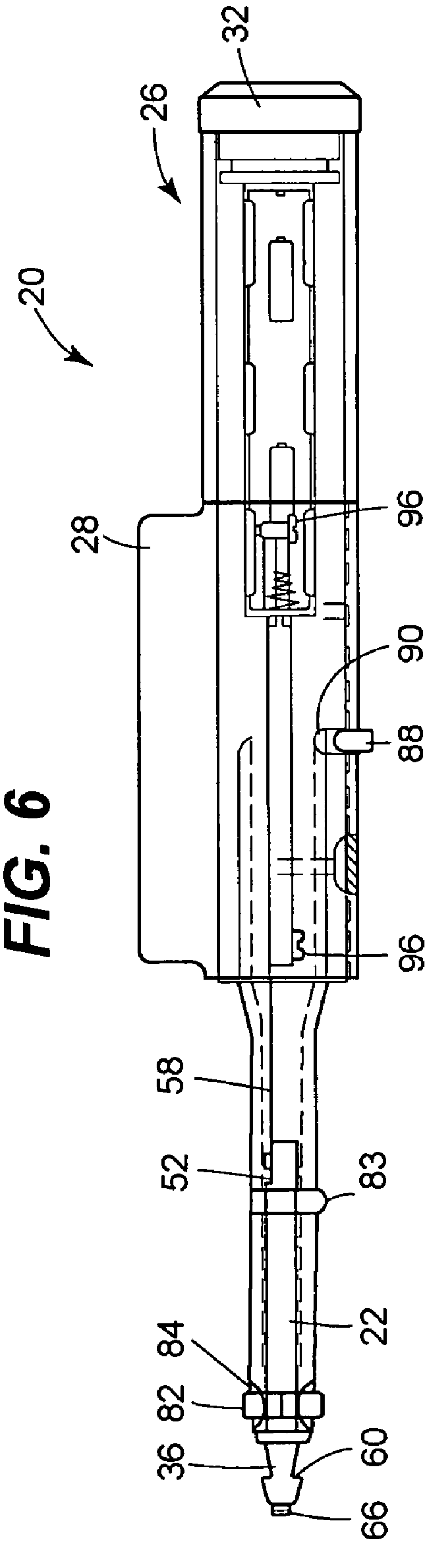
FIG. 6 is a sectional view of the torque wrench of FIG. 1 taken along line 6—6 of FIG. 1.

Referring now to FIGS. 2–4, the manner in which the transducer beam 22 is connected to the mounting bar 24 as shown in detail. More specifically, it will be noted that first and second mounting pins 82, 83 are swaged to, or otherwise frictionally interfit with, the mounting bar 24 and the transducer beam 22 for securement thereof. In addition, washers 84 may be used as depicted best in FIG. 6. The pins 82, 83 extend not only through the mounting holes 50 provided within the transducer beam 22, but correspondingly aligned apertures 86 provided within the mounting bar 24. The first pin 82 may be secured more tightly than the second pin 83 so as to provide a certain degree of play between the transducer beam 22 and the mounting bar 24 at the second pin 83.

Among other benefits, by connecting the transducer beam 22 to the mounting bar 24 in such a fashion, the strain resulting in the web 48 due to any factor other than rotational force being directed on the handle 26 is minimized. More specifically, since the pins 82 are aligned along the longitudinal axis 76, with the sensors 56 and 72 being mounted directly therebetween and also in alignment with the longitudinal axis 76, any rotational force directed against the end 26 is evenly distributed across the internal web 48 to result in a more accurate reading. In addition, by flanking the sensors 56 and 72 with the pins 82 along the longitudinal axis 76, any bending force, i.e., non-rotational force directed against the wrench 20, and any resulting stress applied to the internal web 48, are minimized in that more than one pivot point is provided.

Referring again to FIG. 6, it will be noted that the mounting bar 24 is secured to the handle 26 in a frictionally interfit arrangement and can be fixedly secured thereto as by welding or the like. Moreover, an interface module mounting pin 88 extends from the handle 26 for slidable mounting in a slot 90 provided in a housing 92 of the interface module 28. As shown best in FIGS. 3 and 4, it can be seen that the housing 92 is provided in first and second substantially clam-shell type halves 94, 95 which can be secured around the handle 26 using rivets or other fasteners 96. However, the clam shell halves 94 provide a mounting aperture 98 sufficiently larger than the handle 26 to allow for a relatively easy rotation of the interface module 26 about the handle 26. As the interface module 28 is hard wired to the sensors 56 and 72 by conductors 58, the degree of rotation of the interface module 28 on the handle 26 needs to be governed to be less than the length of the wiring 58. Accordingly, the pin 88 and the slot 90 enables the interface module 28 to rotate, for example, thirty to sixty degrees, or whatever range of motion is afforded by the length of the wiring 58.

Figure 5:
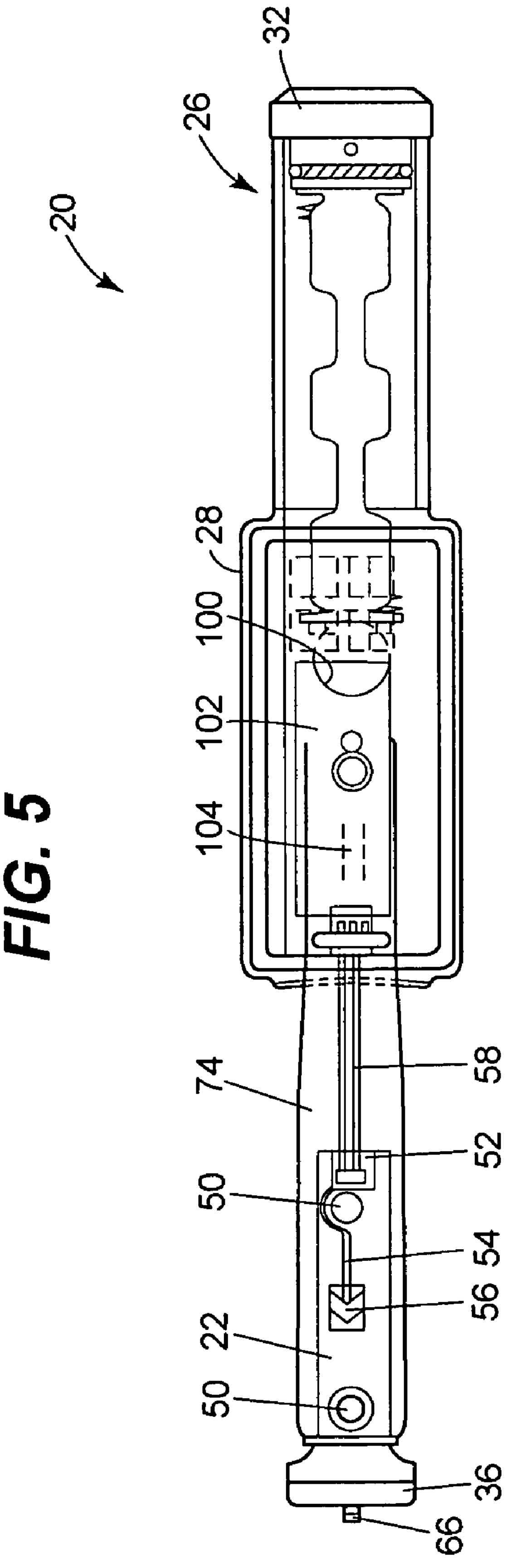
FIG. 5 is a sectional view of the torque wrench of FIG. 1 taken along line 5—5 of FIG. 1.

Moreover, it will be noted that the handle 26 is provided with a wiring hole 100 (see FIG. 5) enabling the conductors 58 to pass therethrough. The wiring hole 100 is provided with a sufficient diameter to allow for the aforementioned rotational movement. Finally, the interface module 28 includes a circuit board 102 including a processor 104 adapted to receive signals from the sensor 56 and 72 representative of the shearing stress applied across the web 48, and in turn generate a signal representative of the torque being generated by the torque wrench 20 for broadcast on a display 106 of interface module 28. The interface module 28 may further include a plurality of interactive push buttons or dials 108 (see FIG. 1) enabling adjustment or refinement of the display 106.

Referring again to FIGS. 7 and 8, the transducer beam 22, which can be manufactured from any number of metals, including but not limited to stainless steel, is shown to include the first and second lateral sides 44 and 46 which taper the width of the transducer beam 22 from the relatively wide tool mounting end 36 to the relatively narrow handle mounting end 38. The importance of doing so is to provide sufficient strength within the transducer beam 22 at those locations where the greatest load is applied when the torque wrench 20 is being used. More specifically, as the greatest load is applied toward the tool mounting end 36, it is provided with the greatest width. Conversely, since the least load is applied proximate the handle mounting end 38 it is provided with the smallest width. Not only does this enable the load to be equalized, but it also equalizes the shearing stress applied across the web 48 to thus result in a more accurate reading. It also results in less material costs in manufacturing of the transducer beam 22.

In operation, it can therefore be seen by one of ordinary skill in the art that the torque wrench can be employed for rotating threaded fasteners to a specified torque with a high degree of specificity. This is due to, among other things, the use of a reduced thickness internal web to which first and second sensors, in opposing orientations, are mounted. First and second mounting pins longitudinally flanking the sensors, and a tapered transducer beam. Moreover, the torque wrench is provided with an interface module providing rotational movement of the display to thus facilitate reading of the measured torque by the operator.

What is claimed is:

1. A torque wrench, comprising:

a transducer beam having a top side, a bottom side, first and second lateral sides, first and second ends, and a web of reduced thickness extending across the transducer beam between the first and second lateral sides;

a sensor mounted on the web to measure a shearing stress;

a torquing tool mounted to the first end of the transducer beam;

a handle, the transducer beam second end being mounted to the handle; and an interface module mounted to the handle, the interface module including a processor electrically coupled to the sensor and a display adapted to receive a signal from the processor and display a torque measurement related to the shearing stress.

2. The torque wrench of claim 1, wherein first and second sensors are mounted to the web, the first sensor being mounted to a top side of the web, the second sensor being mounted to a bottom side of the web.

3. The torque wrench of claim 1, wherein the transducer beam includes an "I" shaped configuration in lateral cross-section.

4. The torque wrench of claim 1, wherein the transducer beam first end includes a dove-tailed engagement structure adapted to be received in the torquing tool.

5. The torque wrench of claim 1, wherein the interface module includes a digital display.

6. The torque wrench of claim 1, further including conductors electrically coupling the sensor to the interface module, the transducer beam including a groove adapted to receive the conductors.

7. A torque wrench, comprising:

a transducer beam having first and second sides, a top surface, and a bottom surface, the first and second sides tapering the beam from a narrow handle end to a wide tool mounting end;

a sensor mounted to the transducer and adapted to generate a signal related to shearing stress applied to the transducer beam; and a processor electrically coupled to the sensor and adapted to generate a signal related to torque based on the shearing stress signal.

8. The torque wrench of claim 7, wherein the transducer beam is mounted to a handle using first and second pins, the pins flanking the sensor and being aligned with a longitudinal axis of the wrench.

9. The torque wrench of claim 8, wherein the processor is provided in an interface module rotationally mounted to the handle.

10. The torque wrench of claim 7, wherein the sensor is coupled to the processor by at least one conductor, the conductor being recessed into a groove provided in the transducer.

11. A torque wrench, comprising:

a transducer beam having first and second ends;

a sensor mounted to the transducer beam and adapted to generate a signal related to shearing stress applied to the transducer beam;

a handle, the transducer beam being mounted to the handle using first and second pins flanking the sensor and aligned with a longitudinal axis of the transducer beam; and an interface module mounted to the handle and including a processor and a display.

12. The torque wrench of claim 11, wherein the transducer beam includes a web of reduced thickness extending across the transducer beam between the first and second sides, and wherein the sensor is mounted to the web.

13. The torque wrench of claim 12, further including a second sensor wherein the first and second sensors are mounted to opposite sides of the web.

14. The torque wrench of claim 13, wherein the first and second sensors are mounted in dissimilar orientations.

15. The torque wrench of claim 11, wherein the sensor is mounted to the interface module by at least one conductor being recessed within a groove provided in the transducer beam.

* * * * *